United States Patent
AlOtaibi et al.

(10) Patent No.: US 11,274,534 B2
(45) Date of Patent: Mar. 15, 2022

(54) ARTIFICIAL RAIN TO SUPPORT WATER FLOODING IN REMOTE OIL FIELDS

(71) Applicant: SAUDI ARABIAN OIL COMPANY, Dhahran (SA)

(72) Inventors: Mohammed Badri AlOtaibi, Dhahran (SA); Dong kyu Cha, Dhahran (SA); Ali Abdallah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/938,002

(22) Filed: Jul. 24, 2020

(65) Prior Publication Data
US 2022/0025748 A1    Jan. 27, 2022

(51) Int. Cl.
| | | |
|---|---|---|
| *E21B 43/20* | (2006.01) | |
| *E21B 43/00* | (2006.01) | |
| *E03B 3/02* | (2006.01) | |
| *A01G 15/00* | (2006.01) | |
| *E21B 43/01* | (2006.01) | |

(52) U.S. Cl.
CPC .............. *E21B 43/20* (2013.01); *A01G 15/00* (2013.01); *E03B 3/02* (2013.01); *E21B 43/00* (2013.01); *E21B 43/01* (2013.01)

(58) Field of Classification Search
CPC .......... E21B 43/20; E21B 43/00; E21B 43/01; A01G 15/00
See application file for complete search history.

(56) References Cited

U.S. PATENT DOCUMENTS

| | | | | |
|---|---|---|---|---|
| 3,331,207 A | * | 7/1967 | McGrew | ................. E02B 13/00 405/39 |
| 3,762,771 A | | 10/1973 | Livingston | |
| 4,214,628 A | * | 7/1980 | Botts | ....................... E21B 43/20 166/90.1 |
| 8,192,633 B2 | * | 6/2012 | Grott | ..................... C09K 17/40 210/774 |

(Continued)

FOREIGN PATENT DOCUMENTS

| | | |
|---|---|---|
| EP | 2716730 A1 | 4/2014 |
| GN | 100532740 C | 8/2009 |

(Continued)

OTHER PUBLICATIONS

Delene, David et al.; "Investing in Rainfall Enhancement: An Innovative Plan for Arid Regions", Qatar Foundation Annual Research Conference Proceedings, vol. 2016; Issue 1; Jan. 1, 2016; pp. 1-2; XP055787489; Retrieved from the Internet: URL: https://doi.org/10.5339/qfarc.2016.EEPP1916 (2 pages).

(Continued)

*Primary Examiner* — Silvana C Runyan
(74) *Attorney, Agent, or Firm* — Osha Bergman Watanabe & Burton LLP

(57) ABSTRACT

Systems and methods for supplying water to a hydrocarbon-containing formation may include generating artificial rain in the proximity of the formation and collecting the artificial rain in one or more collectors. Following collection, the artificial rain may be transferred from the one or more collectors to an underground water reservoir. The artificial rain may then be combined with an aqueous fluid to give a wellbore fluid, which may then be transferred or injected into the wellbore.

26 Claims, 2 Drawing Sheets

(56) References Cited

U.S. PATENT DOCUMENTS

| | | | |
|---|---|---|---|
| 2010/0272630 A1* | 10/2010 | Rosenbaum | C02F 1/04 |
| | | | 423/580.1 |
| 2018/0292826 A1 | 10/2018 | DeFelice et al. | |
| 2020/0024833 A1* | 1/2020 | Azzouni | E03B 3/06 |

FOREIGN PATENT DOCUMENTS

| | | |
|---|---|---|
| WO | 2010129174 A1 | 11/2010 |
| WO | 2013173236 A1 | 11/2013 |
| WO | 2014165921 A1 | 10/2014 |

OTHER PUBLICATIONS

"Saudi throws its support behind cloud-seeding technology | Arab News Japan", Feb. 19, 2020, XP055787664; Retrieved from the Internet: URL: https://www.arabnews.jp/en/saudi-arabaia/article_11057 (4 pages).

International Search Report and Written Opinion issued in Application No. PCT/US2020/052603, dated Apr. 8, 2021 (15 pages).

DeFelice, Tom P., "Modern and prospective technologies for weather modification activities: Developing a framework for integrating autonomous unmanned aircraft systems", Atmospheric Research, ATMOS 3937, Apr. 2017, doi 10.1016/j.atmosres.2017.04.024 (36 pages).

Akalily, Annisa and Donny Harisuseno, "Artificial Rain Technology as an Alternative Increasing Sutami Reservoir Volume in Effort Tackling Drought Due to Global Climate Change", Managing Assets and Infrastructure in the Chaotic Global Economic Competitiveness, International Conference on Construction Industry, Facilities and Asset Management, Padang, Indonesia, Nov. 2012, pp. 189-196 (8 pages).

* cited by examiner

ARTIFICIAL RAIN TO SUPPORT WATER FLOODING IN REMOTE OIL FIELDS

BACKGROUND

Many oilfield processes and operations require the intensive use of water. For instance, water injection may be used in processes such as well testing, secondary recovery (such as waterflooding), and enhanced oil recovery (EOR), which enables the extraction of hydrocarbon reserves that cannot be accessed by conventional recovery processes. Generally, the source of water is not particularly limited and may be one or more of the ocean, a lake, a river, a reservoir, and the like. The source selected for a given oilfield is dependent upon the natural resources that are available and accessible to that oilfield. However, some oilfields may be situated in remote locations that have no accessible water resources. As a result, providing water to such oilfields is impractical and may require the construction of large and inefficient infrastructure projects, such as long distance pipelines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments herein relate to a method of supplying water to a hydrocarbon-containing formation. The method may include generating artificial rain in the proximity of the formation and collecting the artificial rain in one or more collectors. Following collection, the artificial rain may be transferred from the one or more collectors to an underground water reservoir. The artificial rain may then be combined with an aqueous fluid to give a wellbore fluid, which may then be transferred or injected into the wellbore.

In some embodiments, the wellbore fluid has a total dissolved solids (TDS) content of 5,000 to 10,000 ppmw. The aqueous fluid may be produced water in some embodiments. In such embodiments, the method may further include collecting the produced water from the formation after the wellbore fluid has been transferred to the formation, and, if necessary, filtering the produced water before it is mixed with the artificial rain.

The artificial rain may be generated by the seeding of one or more clouds. For example, the artificial rain may be generated by the seeding of one or more clouds with an iodide salt.

The collecting of the artificial rain may include capturing the artificial rain in 2 to 10 collectors, for example. In various embodiments, each of the collectors may have a collection surface area of 1,000 to 10,000 $ft^2$. The artificial rain may be generated, for example, at a distance of 3 miles or less from the one or more collectors.

In some embodiments, the wellbore fluid may remain underground as it is transferred from the water reservoir to the formation.

In another aspect, embodiments herein are directed toward a method for recovering hydrocarbons from a hydrocarbon-containing formation. The method may include generating artificial rain in the proximity of the formation and collecting the artificial rain in one or more collectors. The artificial rain may then be transferred from the one or more collectors to an underground water reservoir. The method may further include mixing the artificial rain with an aqueous fluid to provide a wellbore fluid, and injecting the wellbore fluid into the formation at an injection well, displacing hydrocarbons from the formation, and thereby recovering the hydrocarbons at a production well.

In another aspect, embodiments herein relate to a system for supplying water to a hydrocarbon-containing formation. The system may include one or more rainwater collectors and an underground water reservoir that is fed by the one or more collectors and is fluidly connected to an injection well. The system may be configured such that water from the reservoir can be fed to the injection well while remaining underground.

The system of some embodiments may also include a mixing tank that is fed by the reservoir and that feeds the injection well. The mixing tank may be used, for example, to mix rainwater, produced water, and/or additives to provide a wellbore fluid to the injection well.

The system may also include gas/oil/water separation system, which may also include a filtration apparatus that is fed by a production well. The produced water recovered from the gas/oil water separation system may be fluidly connected to and provide produced water to the mixing tank.

Other aspects and advantages of the claimed subject matter will be apparent from the following description and the appended claims.

DETAILED DESCRIPTION

Embodiments in accordance with the present disclosure generally relate to methods for supplying water to remote oilfields. In one or more embodiments, the water may be supplied by artificial rain.

Methods of one or more embodiments may involve advantageously inducing artificial rainfall proximal to the oilfield. The rain water may then be collected and pumped underground to a water reservoir. In one or more embodiments, the water contained by the reservoir can then be utilized in a nearby injection well for processes such as EOR.

The oilfield of methods of one or more embodiments is not particularly limited, and may be any oilfield that is situated remotely from an accessible water supply of a sufficient size to support the desired oilfield processes. As used herein, the term "oilfield" is intended to refer to a location, such as an area of land, containing an accumulation of hydrocarbons (i.e. crude oil and/or natural gas). In general, the hydrocarbon reserves are accumulated in a subterranean location and are of a sufficient size to merit commercial exploitation.

In one or more embodiments, methods may provide water to an oilfield that is located at a distance of 20 miles or more, 50 miles or more, 100 miles or more, 250 miles or more, 500 miles or more, 750 miles or more, 1,000 miles or more, or 1,250 miles or more from the nearest accessible water supply that is of a sufficient size to support the intended oilfield process.

A method in accordance with one or more embodiments of the present disclosure is depicted by, and discussed with reference to, FIG. 1.

Figure 1:
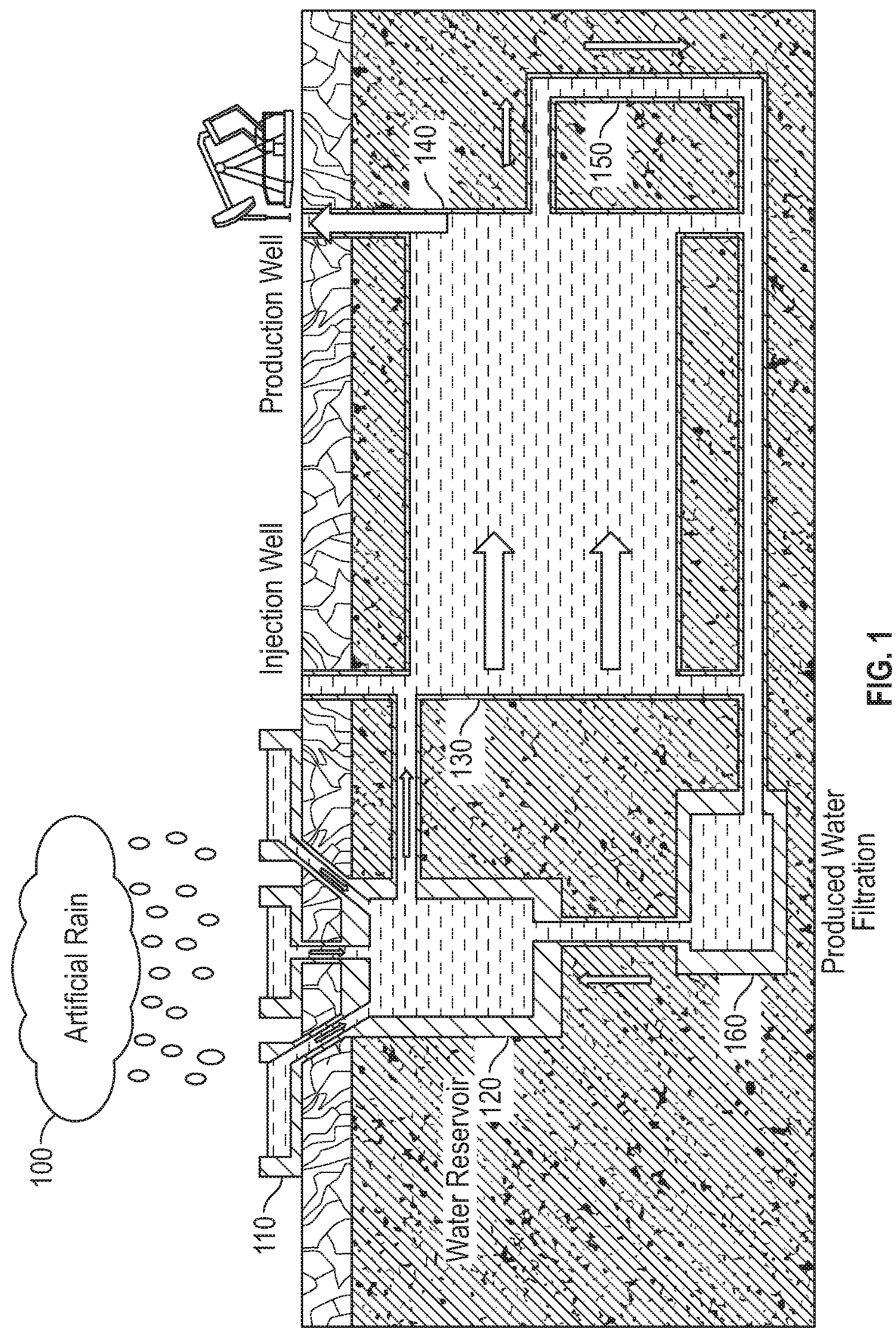
FIG. 1 is a schematic representation of a method of supplying water to a hydrocarbon-bearing formation in accordance with one or more embodiments of the present disclosure.

As depicted by FIG. 1, the methods of one or more embodiments may involve the generation of artificial rain 100. In some embodiments, the artificial rain may be generated at a location that is relatively proximal to the oilfield, such as at a location that is closer to the oilfield than the nearest accessible water supply is.

The method of generating artificial rain of one or more embodiments is not particularly limited and may be any suitable method known to a person of ordinary skill in the art. As used herein, the term "artificial rain" (also known as rainmaking) refers to the artificial induction, enhancement, or alteration, of precipitation. With the benefit of this disclosure, a person of ordinary skill in the art will appreciate that the selection of a suitable method of artificial rain generation is dependent upon the oilfield's local climate and atmospheric conditions.

In one or more embodiments, the method of generating artificial rain may be cloud seeding. Cloud seeding involves the dispersion of one or more seeding agents into an existing cloud. These seeding agents may alter the structure of the cloud and lead to the inducement of, or increase in, rainfall. The seeding agent may serve as a nucleation point for water vapor condensation. The seeding agent of one or more embodiments may be either a glaciogenic or a hygroscopic material.

In some embodiments, the seeding agent may be a glaciogenic material such as one or more of silver iodide, potassium iodide, lead iodide, cupric sulfide, organic seeding agents (such as phloroglucinol and metaldehyde), and dry ice. In particular embodiments, the seeding agent may be silver iodide, which has a crystalline structure similar to the natural ice crystal. The use of iodide salts further enables any fluids generated from the artificial rain to be traced by various analytical techniques. This aids the assessment of properties, such as early water breakthrough, and the corresponding adjustment of the injection strategy. Iodide is an anion that is generally distinct from the other dissolved salts that are present in wellbore treatment fluids.

In other embodiments, where the atmospheric conditions are suitable (for example, with warm clouds) the seeding agent may be dry ice.

In one or more embodiments, the cloud seeding may be performed by a manned aircraft or by an unmanned aircraft (such as a drone). The cloud to be seeded may not be particularly limited, as long as it is suitable for seeding. As noted above, several factors can impact the artificial rain processes, such as the type of cloud, as well as the temperature, moisture content, droplet size distribution, and updraft velocities in the cloud, among others. For example, cloud seeding with silver iodide may be effective only if the cloud is supercooled and the proper ratio of cloud droplets to ice crystals exists, and the temperature is 25° F. (−4° C.) or below. In some embodiments, the seeded cloud may possess one or more of a sustainable updraft of moist air, a lack of natural ice, and at a suitable altitude to contain super-cooled liquid water. These conditions may be evaluated with the help of weather radar data and weather satellite information to analyze the targeted area before or during the cloud seeding is performed.

In one or more embodiments, the artificial rain may be generated at a distance of 50 miles or less, 25 miles or less, 10 miles or less, 5 miles or less, or 2 miles or less, from the oilfield.

The artificial rain generation of methods of one or more embodiments may generate sufficient water to perform the intended wellbore process. This amount is dependent upon many factors, including the quantity of the produced water that exists in the area, the number of injection wells/processes in which it is to be used, the size of the oilfield, and the targeted water salinity range for the injection. In one or more embodiments, the artificial rain may generate water in an amount of 5,000 barrels (bbl) per day or more, 10,000 bbl per day or more, 25,000 bbl per day or more, 50,000 bbl per day or more, or 100,000 bbl per day or more. In one or more embodiments, at least a portion of the water needed may be generated substantially before the wellbore treatment is performed, and stored. In some embodiments, at least a portion of the water may be generated while the wellbore treatment is being performed.

As depicted by FIG. 1, the methods of one or more embodiments may involve the collection of the artificial rain 100 in one or more collectors 110. The collectors of one or more embodiments may be located on the ground and may be specifically designed for rain harvesting. In one or more embodiments, the artificial rain may be generated at a distance of 50 miles or less, 25 miles or less, 10 miles or less, 5 miles or less, 3 miles or less, 2 miles or less, or 1 mile or less from the one or more collectors.

In one or more embodiments, the collectors may be cylindrical in shape. In some embodiments, the collection of the artificial rain may involve the use of one or more collectors, two or more collectors, three or more collectors, or four or more collectors. In one or more embodiments, the collection of artificial rain may involve the use of a number of collectors of a range having a lower limit of any of 1, 2, 3, 4, 5, and 6, and an upper limit of any of 5, 6, 7, 8, 9, 10, 12, 15, 20, 50, and 100, where any lower limit may be combined with any mathematically-compatible upper limit. In some embodiments, the number of collectors selected depends upon the wellbore operations strategy. In general, the use of more than one collector may provide the ability to perform maintenance without stopping water injection.

In one or more embodiments, the one or more collectors may have a collection surface area of 1,000 ft$^2$ or more, 2,000 ft$^2$ or more, or 2,500 ft$^2$ or more. In one or more embodiments, the one or more collectors may have a collection surface area of a range having a lower limit of any of 500, 1,000, 1,500, 2,000, and 2,500 ft$^2$ and an upper limit of any of 2,500, 3,000, 3,500, 5,000, 10,000, and 25,000 ft$^2$, where any lower limit may be combined with any mathematically-compatible upper limit. In embodiments where more than one collectors are used, the collectors may have a surface area that is the same as, or different from, one another.

In one or more embodiments, the one or more collectors may be located adjacent to the oilfield, and may be connected to one or more injection wells by a network of pipelines. In one or more embodiments, the one or more collectors may be located at a distance of 10 miles or less, 5 miles or less, 3 miles or less, 2 miles or less, 1 mile or less, or 0.5 miles or less from the one or more injection wells.

As depicted by FIG. 1, the methods of one or more embodiments may involve transferring the artificial rain 100 from the one or more collectors 110 to one or more water reservoirs 120.

The methods of one or more embodiments may include one or more or two or more water reservoirs. Each water reservoir may supply water to one injection well or to more than one injection well. The water reservoir of one or more embodiments may have sufficient capacity to supply enough water to one or more injection wells. In one or more embodiments, the water reservoir may have a water capacity of 1,000 bbl or more, 2,500 bbl or more, 5,000 bbl or more, 10,000 bbl or more, 25,000 bbl or more, 50,000 bbl or more, or 100,000 bbl or more. In embodiments utilizing more than one water reservoir, the water reservoirs may have a water capacity that is the same as, or different from, one another.

In one or more embodiments, the water reservoirs may be located underground. In some embodiments, the reservoirs being located underground may help provide consistent water storage, quality and temperature, and limit exposure to extreme weather conditions like heat or strong winds and natural disasters. In other embodiments, as a result of economic considerations, at least a portion of the water reservoirs may be located above the surface.

In some embodiments, the rainwater may be used from one or more of the collectors 110 and the water reservoir 120 for non-wellbore applications. For instance, the rainwater may be used as a water supply for residential and commercial facilities located on or near the oilfield.

As depicted by FIG. 1, the method of one or more embodiments may involve injecting the water from the one or more water reservoirs 120 into a hydrocarbon-containing formation at an injection well 130.

The water from the one or more reservoirs may be transferred to the injection well by any suitable means known by a person of ordinary skill in the art, such as through the use of pumps. In one or more embodiments, the water may be transferred underground form the reservoir to the injection well. In other embodiments, the water may be transferred above ground. The water may be used in the injection well for oil recovery purposes. The wellbore treatment operation of one or more embodiments may be any operation involving the use of water. In some embodiments, the method may comprise well testing, a fracturing process, a well stimulation process, a secondary recovery process, or an EOR process. In other embodiments, the water may instead by used to recharge an underground aquifer through gravity water injection procedures.

Methods of one or more embodiments may involve altering the composition of the water stored in the water reservoir 120 before it is suitable for injection at the injection well 130. A person of ordinary skill in the art would appreciate, with the benefit of this disclosure, that the composition of the injection water is highly dependent upon its intended application. In one or more embodiments, the composition of the stored water may be modified by mixing with one or more other aqueous fluids to provide a wellbore fluid. In some embodiments, the mixing may be performed in the water reservoir or in a separate mixing tank (not shown in FIG. 1). For example, for a produced water having a salinity of about 200,000 ppm, produced water may be mixed with rainwater at a ratio of 1:19 (produced water to rainwater) to achieve an injection water having a salinity of about 10,000 ppm; the ratio used may vary widely, and may depend upon the salinity of the produced water and the desired salinity of the injection water.

The aqueous fluid of one or more embodiments may include at least one of natural and synthetic water, fresh water, seawater, brine, brackish water, formation water, produced water, and mixtures thereof. In particular embodiments, the aqueous fluid may be produced water. The aqueous fluid may be fresh water that is formulated to contain various salts. The aqueous fluid may contain salts that include, but are not limited to, alkali metal and alkaline earth metal halides, hydroxides, carbonates, bicarbonates, sulfates, and phosphates. In one or more embodiments, the brine may be any of seawater, aqueous solutions where the salt concentration is less than that of seawater, or aqueous solutions where the salt concentration is greater than that of seawater. Salts that may be found in the aqueous fluid may include salts that produce disassociated ions of sodium, calcium, aluminum, magnesium, potassium, strontium, lithium, halides, carbonates, bicarbonates, sulfates, chlorates, bromates, nitrates, oxides, and phosphates, among others. In some embodiments, the aqueous fluid may include one or more of the group consisting of an alkali metal halide, an alkali metal sulfate salt, an alkaline earth metal halide, and an alkali metal bicarbonate salt. In particular embodiments, the aqueous fluid may comprise one or more of the group consisting of sodium chloride, calcium chloride, magnesium chloride, sodium sulfate, and sodium bicarbonate. Any of the aforementioned salts may be included in brine.

After mixing, the wellbore fluid of one or more embodiments may have a total dissolved solids (TDS) of 1,000 parts per million by weight (ppmw) or more, 3,000 ppmw or more, or 5,000 ppmw or more. In some embodiments, the wellbore fluid may have a TDS of an amount of a range having a lower limit of any of 1,000, 3,000, 4,000 5,000, 6,000, 7,000, and 8,000 ppmw and an upper limit of any of 7,000, 8,000, 9,000, 10,000, 12,000 and 15,000 ppmw, where any lower limit can be used in combination with any mathematically-compatible upper limit. A person of ordinary skill in the art would appreciate with the benefit of this disclosure that the density of the wellbore fluid, may be affected by the salt concentration of the aqueous fluid. The maximum concentration of a given salt is determined by its solubility.

Except for the salts discussed above, the wellbore fluid in accordance with one or more embodiments of the present disclosure may be free of any other additives. In one or more embodiments, the wellbore fluid may comprise additional additives in an amount of 5,000 ppmw or less, 1,000 ppmw or less, 500 ppmw or less, or 100 ppmw or less. In some embodiments, the wellbore fluid may comprise the additives in an amount of 100 ppmw or less.

In other embodiments, the wellbore fluid may contain one or more additives. Such additives may be any suitable additive known to a person of ordinary skill in the art and their selection may be dependent upon the desired application of the method. The additives of one or more embodiments may be added to the wellbore fluid in a mixing tank, either with or without the aqueous fluid. In some embodiments, the additives may be one or more selected from the group consisting of surfactants, foaming agents, proppants, viscosifiers, pH adjusting agents, wetting agents, corrosion inhibitors, scale inhibitors, oxygen scavengers, anti-oxidants, biocides, surfactants, dispersants, interfacial tension reducers, mutual solvents, thinning agents, breakers, and crosslinkers. The mixing of the additives, for example, may be conducted in-line, external to the rainwater storage reservoir, prior to injection into a well; in some embodiments, a separate mixing tank may be provided to combine rainwater, produced water, and/or additives to form a wellbore fluid.

Methods in accordance with the present disclosure may further comprise testing the stored rainwater and/or the wellbore fluid to determine its composition. In some embodiments, the mixing of the rainwater with the one or more aqueous fluids may be controlled or adjusted in response to the compositional analysis. In one or more embodiments, the composition of the stored rainwater and/or the wellbore fluid may be determined by an in-line sensor that measures the electrical conductivity of the water. Additionally, or alternatively, in some embodiments, the composition may be determined by collecting random samples and analyzing them by standard analytical techniques, such as Inductively Coupled Plasma Mass Spectrometry (ICP-MS). These techniques may provide a more detailed analysis of the various cation and anion concentrations, but are not performed in situ, unlike in-line measurements.

In one or more embodiments, the wellbore fluid may contain little to no solid material. For example, the wellbore fluids of some embodiments may contain solid material in an amount of 2 wt. % or less, 1 wt. % or less, 0.5 wt. % or less, 0.1 wt. % or less, 0.05 wt. % or less, 0.01 wt. % or less, or 0.001 wt. % or less.

In one or more embodiments, the wellbore fluid may have a density that is greater than 1.00 $g/cm^3$. For example, the wellbore fluid may have a density that is of an amount of a range having a lower limit of any of 1.00, 1.05, 1.10, 1.15, and 1.20 $g/cm^3$ and an upper limit of any of 1.05, 1.10, 1.15, 1.20, 1.25, and 1.30 $g/cm^3$, where any lower limit can be used in combination with any mathematically-compatible upper limit.

In one or more embodiments, the wellbore fluid may have a pH in a range from 5 to 10, such as within the range of 6 to 8.

As depicted by FIG. 1, the methods of one or more embodiments may involve injecting the wellbore fluid into the hydrocarbon-containing formation at the injection well 130. Depending upon the purpose of a given method, the wellbore fluid may be injected at a pressure below, at, or above, the fracture pressure of the formation. For example, for use in waterflooding, the wellbore fluid may be injected at a pressure below the fracture pressure of the formation.

The method of one or more embodiments may be directed to recovering hydrocarbons. In such embodiments, the wellbore fluid may be injected at a pressure below the fracture pressure of the formation, and the wellbore fluid may displace hydrocarbons from the formation. As depicted by FIG. 1, in some embodiments, the displaced hydrocarbons may be recovered at a production well 140. In one or more embodiments, the method of recovering hydrocarbons may be secondary recovery process (such as waterflooding), in which the wellbore fluid displaces residual hydrocarbons by physically sweeping them out of the formation.

In other embodiments, the method of recovering hydrocarbons may be EOR, where the properties of one or more of the hydrocarbons and the formation are chemically or physically altered to enable more efficient recovery.

As depicted by FIG. 1, the methods of one or more embodiments may involve recycling the produced water 150 from the production well 140. The fluids recovered in a production well may include, for example, water, hydrocarbons, and suspended solids. The total suspended solids may depend on the rock properties (rock type, porosity, pore size, etc.), and total suspended solids may be up to about 30 ppm and may have a mean particle size of 5 microns, for example. The water can be separated from the produced hydrocarbons by use of a Gas-Oil Separation Plant (GOSP). In some embodiments, the produced water 150 may be filtered 160 and transferred to a water reservoir or mixing tank. The method of filtering the produced water is not particularly limited and may be any such method known to a person of ordinary skill in the art suitable for the type and amount of suspended solids. In such embodiments, where the produced water is recycled to the injection well, the produced water 150 may be used as the aqueous fluid to formulate the wellbore fluids described previously. As the initial produced water may be expected to have a high salinity, reduced over time, the procedures and formulations for mixing the rainwater and produced water to form the injection fluid may be adjusted accordingly. In some embodiments, the circulation and filtration of the produced water may be performed at the surface, and not further underground than the water reservoir as is shown in FIG. 1 for convenience. In other embodiments, the circulation and filtration of the produced water is performed underground.

The produced water of one or more embodiments may have a total dissolved solids (TDS) of 3,000 ppmw or more, 5,000 ppmw or more, 10,000 ppmw or more, or 20,000 ppmw or more. In some embodiments, the produced water may have a TDS of an amount of a range having a lower limit of any of 3,000, 5,000, 7,000, 10,000, 15,000, 20,000, and 25,000 ppmw and an upper limit of any of 25,000, 30,000 40,000, 50,000 and 60,000 ppmw, where any lower limit can be used in combination with any mathematically-compatible upper limit. A person of ordinary skill in the art would appreciate with the benefit of this disclosure that the density of the produced water, may be affected by the salt concentration of the aqueous fluid. The maximum concentration of a given salt is determined by its solubility.

Before filtering, the produced water may contain solid material. For example, the unfiltered produced water of some embodiments may contain solid material in an amount of 0.5 wt. % or more, 1.0 wt. % or more, 2.0 wt. % or more, or 5.0 wt. % or more. After filtering, the produced water may contain little to no solid material. For example, the filtered produced water of some embodiments may contain solid material in an amount of 2 wt. % or less, 1 wt. % or less, 0.5 wt. % or less, 0.1 wt. % or less, 0.05 wt. % or less, 0.01 wt. % or less, or 0.001 wt. % or less.

In one or more embodiments, the produced water 150 may have a density that is greater than 1.00 $g/cm^3$. For example, the produced water may have a density that is of an amount of a range having a lower limit of any of 1.00, 1.05, 1.10, 1.15, and 1.20 $g/cm^3$ and an upper limit of any of 1.05, 1.10, 1.15, 1.20, 1.25, and 1.30 $g/cm^3$, where any lower limit can be used in combination with any mathematically-compatible upper limit.

Figure 2:
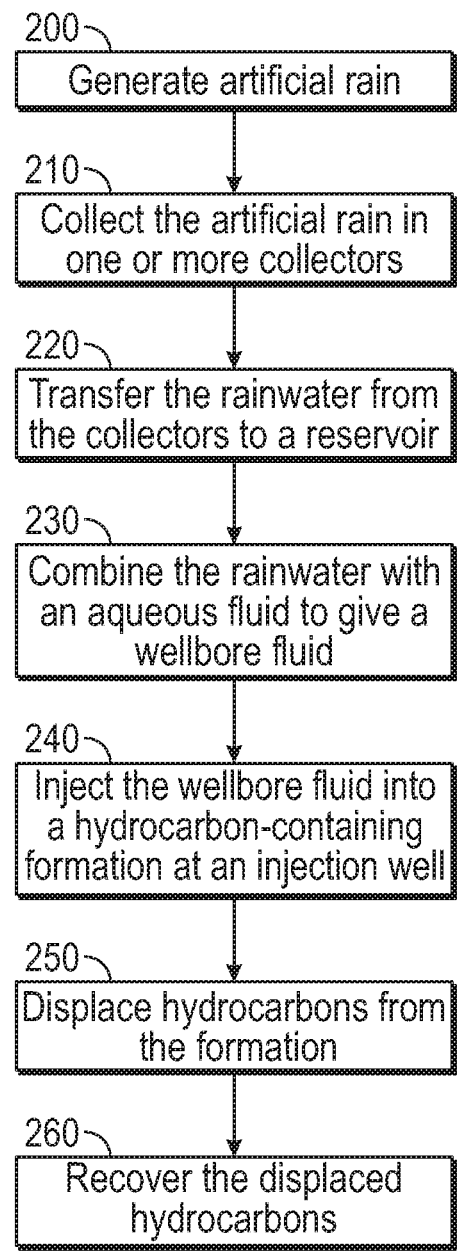
FIG. 2 is a flowchart depicting a method of supplying water to a hydrocarbon-bearing formation in accordance with one or more embodiments of the present disclosure.

As described previously, the methods of one or more embodiments may be used for recovering hydrocarbons from an injection well. A hydrocarbon recovery process in accordance with one or more embodiments of the present disclosure is depicted by, and discussed with reference to, FIG. 2.

Specifically, in step 200, artificial rain may be generated, as discussed previously. In step 210, the artificial rain may be collected in one or more collectors. In step 220, the collected rainwater may be transferred to one or more reservoirs. The reservoirs may be located underground. In step 230, the rainwater may then be mixed with an aqueous fluid to provide a wellbore fluid. The mixing may be performed in either the reservoir itself or in a mixing tank. In step 240, the wellbore fluid may be injected into a hydrocarbon-bearing formation at an injection well. In some embodiments, the wellbore fluid may remain underground as it is transferred from the reservoir to the injection well. In some embodiments, the injection of the wellbore fluid may be performed at a pressure that is below the fracturing pressure of the formation. In step 250, hydrocarbons may be displaced from the formation by the injected wellbore fluid. In step 260, the displaced hydrocarbons may be recovered from the formation. In one or more embodiments, the hydrocarbons may be recovered at a production well. In one or more embodiments (not shown), produced water may also be recovered at the production well. This produced water may, in some embodiments, be combined with the rainwater to yield the wellbore fluid.

In one or more embodiments, the hydrocarbon recovery processes may be repeated one or more times to increase the amount of hydrocarbons recovered. In some embodiments, subsequent recovery processes may involve the use of wellbore fluids having different salinities than the first.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of supplying water to a hydrocarbon-containing formation, comprising:
   generating artificial rain proximal to the hydrocarbon-containing formation;
   collecting the artificial rain in one or more collectors;
   transferring the artificial rain from the one or more collectors to an underground water reservoir;
   combining the artificial rain with an aqueous fluid to give a wellbore fluid; and
   transferring the wellbore fluid to the hydrocarbon-containing formation.

2. The method of claim 1, wherein the wellbore fluid has a total dissolved solids (TDS) content of 5,000 to 10,000 ppmw.

3. The method of claim 1, wherein the aqueous fluid is produced water.

4. The method of claim 3, further comprising collecting the produced water from the hydrocarbon-containing formation after the wellbore fluid has been transferred to the hydrocarbon-containing formation.

5. The method of claim 4, further comprising filtering the produced water before it is mixed with the artificial rain.

6. The method of claim 1, wherein the artificial rain is generated by seeding one or more clouds with an iodide salt.

7. The method of claim 1, wherein the collecting of the artificial rain comprises 2 to 10 collectors.

8. The method of claim 1, wherein each of the one or more collectors have a collection surface area of 1,000 to 10,000 ft$^2$.

9. The method of claim 1, wherein the artificial rain is generated at a distance of 3 miles or less from the one or more collectors.

10. The method of claim 1, wherein the wellbore fluid remains underground as it is transferred from the underground water reservoir to the hydrocarbon-containing formation.

11. A method for recovering hydrocarbons from a hydrocarbon-containing formation, the method comprising:
    generating artificial rain proximal to the hydrocarbon-containing formation;
    collecting the artificial rain in one or more collectors;
    transferring the artificial rain from the one or more collectors to an underground water reservoir;
    mixing the artificial rain with an aqueous fluid to provide a wellbore fluid;
    injecting the aqueous wellbore fluid into the hydrocarbon-containing formation at an injection well;
    displacing hydrocarbons from the hydrocarbon-containing formation; and
    recovering the hydrocarbons at a production well.

12. The method of claim 11, wherein the wellbore fluid has a total dissolved solids (TDS) content of 5,000 to 10,000 ppmw.

13. The method of claim 11, wherein the aqueous fluid is produced water.

14. The method of claim 13, further comprising collecting the produced water at the production well.

15. The method of claim 14, further comprising filtering the produced water before it is mixed with the artificial rain.

16. The method of claim 11, wherein the artificial rain is generated by seeding one or more cloud with an iodide salt.

17. The method of claim 11, wherein the collecting of the artificial rain comprises 2 to 10 collectors.

18. The method of claim 11, wherein each of the one or more collectors have a collection surface area of 1,000 to 10,000 ft$^2$.

19. The method of claim 11, wherein the artificial rain is generated at a distance of 3 miles or less from the one or more collectors.

20. The method of claim 11, wherein the wellbore fluid remains underground as it is transferred from the water reservoir to the injection well.

21. A system for supplying water to a hydrocarbon-containing formation, comprising:
    one or more rainwater collectors; and
    an underground water reservoir that is fed by the one or more collectors and is connected to an injection well, where the injection well is fluidly connected to the hydrocarbon-containing formation;
    wherein the system is configured such that water is transferred underground from the underground water reservoir to the injection well.

22. The system of claim 21, further comprising a filtration apparatus that is fed by a production well and that feeds the underground water reservoir.

23. The system of claim 21, further comprising a mixing tank that is fed by the underground water reservoir and that feeds the injection well.

24. The system of claim 23, further comprising a filtration apparatus that is fed by a production well and that feeds the mixing tank.

25. The system of claim 21, wherein the system comprises 2 to 10 collectors.

26. The system of claim 21, wherein each of the one or more collectors have a collection surface area of 1,000 to 10,000 ft$^2$.

* * * * *